US010097588B2

(12) United States Patent
Lee et al.

(10) Patent No.: US 10,097,588 B2
(45) Date of Patent: Oct. 9, 2018

(54) METHOD AND SYSTEM FOR CONFIGURING SIMPLE KERNEL ACCESS CONTROL POLICY FOR ANDROID-BASED MOBILE TERMINAL

(71) Applicant: AGENCY FOR DEFENSE DEVELOPMENT, Daejeon (KR)

(72) Inventors: Sang-Hoon Lee, Seoul (KR); Hoon-Kyu Kim, Seoul (KR); Mi-Young Kwon, Seoul (KR); Tae-In Kang, Seoul (KR); Seong-Kee Lee, Seoul (KR); Seung-Ho Han, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 170 days.

(21) Appl. No.: 15/370,270

(22) Filed: Dec. 6, 2016

(65) Prior Publication Data

US 2018/0054462 A1 Feb. 22, 2018

(30) Foreign Application Priority Data

Aug. 19, 2016 (KR) .......................... 10-2016-0105459

(51) Int. Cl.
 *H04L 29/06* (2006.01)
 *H04L 29/08* (2006.01)
 (Continued)

(52) U.S. Cl.
 CPC .............. *H04L 63/20* (2013.01); *G06F 21/00* (2013.01); *H04L 63/10* (2013.01); *H04L 63/104* (2013.01);
 (Continued)

(58) Field of Classification Search
 CPC ... H04L 63/10; H04L 63/20; H04L 29/06986; H04L 67/42; H04L 67/303
 See application file for complete search history.

(56) References Cited

U.S. PATENT DOCUMENTS

2003/0115246 A1* 6/2003 Mahon .............. H04L 29/12216
 709/200
2004/0193606 A1* 9/2004 Arai ....................... G06F 21/604
 (Continued)

FOREIGN PATENT DOCUMENTS

KR 2014-0044974 A 4/2014
KR 20160042110 A 4/2016

OTHER PUBLICATIONS

Youngseok Choi et al., "Study to detect and block leakage of personal information: Android-platform environment," Journal of The Korea Institute of Information Security & Cryptology (JKIISC), vol. 23, No. 4, Aug. 2013, pp. 757-766.

*Primary Examiner* — Eleni A Shiferaw
*Assistant Examiner* — Sher A Khan
(74) *Attorney, Agent, or Firm* — LRK Patent Law Firm

(57) ABSTRACT

A method of configuring a simple kernel access control policy for an Android-based mobile terminal includes: creating an entire list in a file system of a plurality of mobile terminals through a web user interface of a management server; creating a system policy set and an application policy set by recognizing in advance subjects and objects in the entire list by means of the management server; creating a group policy for each user group on the basis of the system policy set and the application policy set by means of the management server; distributing the group policies to the mobile terminals by means of the management server; and executing the group policies by means of the mobile terminals.

5 Claims, 15 Drawing Sheets

(51) Int. Cl.
*G06F 21/00* (2013.01)
*H04W 12/08* (2009.01)
*H04W 88/02* (2009.01)
*H04L 12/24* (2006.01)

(52) U.S. Cl.
CPC ............ *H04L 67/303* (2013.01); *H04L 67/42* (2013.01); *H04W 12/08* (2013.01); *H04L 41/0893* (2013.01); *H04W 88/02* (2013.01)

(56) References Cited

U.S. PATENT DOCUMENTS

| | | | |
|---|---|---|---|
| 2005/0257245 A1* | 11/2005 | Patrick | H04L 63/0263 726/1 |
| 2005/0262362 A1* | 11/2005 | Patrick | H04L 63/0263 713/193 |
| 2006/0190984 A1* | 8/2006 | Heard | H04L 63/102 726/1 |
| 2008/0294586 A1* | 11/2008 | Lim | G06F 9/468 706/47 |
| 2012/0011560 A1* | 1/2012 | Natarajan | G06F 21/604 726/1 |

\* cited by examiner

FIG.7

| | | MONITOR | TERMINAL CONTROL | REGISTRATION MANAGEMENT | POLICY MANAGEMENT | APP MANAGEMENT |
|---|---|---|---|---|---|---|
| POLICY LIST | KERNEL POLICY/ADD POLICY | | | | | |
| CREATE POLICY | △ SUBJECT :all ▽ | △ OBJECT :all ▽ | | | | |
| APPLY POLICY | ADD DELETE | | | | | |
| | ○ | CLASS | FUNCTION NAME | FUNCTION NAME | | |
| | ○ | SYSTEM | App | APP BASIC AUTHORITY | CHANGE | |
| | ○ | SYSTEM | Bluetooth | BLUETOOTH BASIC AUTHORITY | CHANGE | |
| | ○ | SYSTEM | Browser | BOWSER BASIC AUTHORITY | CHANGE | |
| | ○ | SYSTEM | Calculator | CALCULATOR BASIC AUTHORITY | CHANGE | |
| | ○ | SYSTEM | Calendar | CALENDAR BASIC AUTHORITY | CHANGE | |
| | ○ | SYSTEM | Camera | CAMERA BASIC AUTHORITY | | |
| | ○ | ... | ... | ... | | |
| | ○ | | | | | |

| | MONITOR | TERMINAL CONTROL | REGISTRATION MANAGEMENT | POLICY MANAGEMENT | APP MANAGEMENT |

KERNEL POLICY>FORMULATE POLICY>SYSTEM POLICY

▷ POLICY NAME: [ ]    ▷ FILE NAME: [ ]

▷ DESCRIPTION OF POLICY: [ ]

| APPLY | APP NAME | APP FUNCTION | DESCRIPTION OF POLICY |
|---|---|---|---|
| ○ | CAMERA | PHOTO DATA ACCESS | CONTROL ACCESS TO PICTURE DATA IN APP |
| ○ | VIDEO | MOVING PICTURE DATA ACCESS | DCONTROL ACCESS TO VIDEO DATA IN APP |
| ○ | RECORDER | RECORDING DATA ACCESS | CONTROL ACCESS TO RECORDING DATA IN APP |
| ○ | MAP | MAP DATA ACCESS | CONTROL ACCESS TO MAP DATA IN APP |
| ○ | MESSENGER | DATA TRANSFER | CONTROL TRANSMISSION OF DATA IN APP |
| ○ | DOCUMENT | DOCUMENT ACCESS | CONTROL ACCESS TO DOCUMENT IN APP |
| ○ | : | : | : |
| ○ | : | : | : |

POLICY LIST
◁ CREATE POLICY
APPLY POLICY

820

[REGISTER] [CANCEL]

FIG.9

| | | | MONITOR | TERMINAL CONTROL | REGISTRATION MANAGEMENT | POLICY MANAGEMENT | APP MANAGEMENT | | |
|---|---|---|---|---|---|---|---|---|---|
| POLICY LIST | KERNEL POLICY | | | | | | | | |
| CREATE POLICY | USER GROUP NAME ▽ | | | SEARCH | ADD POLICY | | SYSTEM POLICY | APP POLICY | |
| APPLY POLICY | POLICY NAME | DESCRIPTION OF POLICY | UPDATE | SEE | APPLIED GROUP | SYSTEM POLICY | APP POLICY | DELETE | |
| | App1 | App1 | 2015/07/24 | SEE | INQUIRE | CHANGE | CHANGE | DELETE | |
| | App1+2 | App1+App2 | 2015/07/24 | SEE | INQUIRE | CHANGE | CHANGE | DELETE | |
| | App1+2+3 BASIC | App1+2+3 BASIC ACCESS | 2015/07/24 | SEE | INQUIRE | CHANGE | CHANGE | DELETE | |
| | App1+2+3 ENTIRE | App1+2+3 ENTIRE ACCESS | 2015/07/24 | SEE | INQUIRE | CHANGE | CHANGE | DELETE | |
| | : | : | : | SEE | INQUIRE | CHANGE | CHANGE | DELETE | |
| | : | : | : | SEE | INQUIRE | CHANGE | CHANGE | DELETE | |
| | : | : | : | SEE | INQUIRE | CHANGE | CHANGE | DELETE | |
| | : | : | : | SEE | INQUIRE | CHANGE | CHANGE | DELETE | |
| | : | : | : | SEE | INQUIRE | CHANGE | CHANGE | DELETE | |

FIG.10

| | MONITOR | TERMINAL CONTROL | REGISTRATION MANAGEMENT | POLICY MANAGEMENT | APP MANAGEMENT | |
|---|---|---|---|---|---|---|
| KERNEL POLICY | | | | | | |

POLICY LIST
CREATE POLICY
APPLY POLICY

| USER GROUP NAME ▷ | | SEARCH | | | |
|---|---|---|---|---|---|
| USER GROUP NAME | GROUP POLICY NAME | DESCRIPTION OF POLICY | POLICY VERSION | POLICY APPLICATION DATE | DELETE |
| WORK1 | App1 | App1 | V1.0 | 2106-04-20 22:07:58 | DELETE |
| WORK2 | App1+2 | App1+App2 | V1.0 | 2106-04-20 22:07:58 | DELETE |
| WORK3 | App1+2+3 BASIC | App1+2+3 BASIC ACCESS | V1.0 | 2106-04-20 22:07:58 | DELETE |
| WORK4 | App1+2+3 ENTIRE | App1+2+3 ENTIRE ACCESS | V1.0 | 2106-04-20 22:07:58 | DELETE |
| .. | .. | .. | | | DELETE |
| .. | .. | .. | | | DELETE |
| .. | .. | .. | | | DELETE |
| .. | .. | .. | | | DELETE |
| .. | .. | .. | | | DELETE |

FIG.11

| SELECT POLICY | | | | |
|---|---|---|---|---|
| SELECT | GROUP POLICY NAME | DESCRIPTION OF POLICY | POLICY VERSION | CREATED DATE |
| ○ | App1 | App1 | V1.0 | 2106-04-20 22:07:58 |
| ○ | App1+2 | App1+App2 | V1.0 | 2106-04-20 22:07:28 |
| ○ | App1+2+3 BASIC | App1+2+3 BASIC ACCESS | V1.0 | 2106-04-20 12:47:23 |
| ● | App1+2+3 ENTIRE | App1+2+3 ENTIRE ACCESS | V1.0 | 2106-04-20 15:07:30 |
| .. | .. | .. | | |
| .. | .. | .. | | |
| .. | .. | .. | | |
| .. | .. | .. | | |
| .. | .. | .. | | |

OK

METHOD AND SYSTEM FOR CONFIGURING SIMPLE KERNEL ACCESS CONTROL POLICY FOR ANDROID-BASED MOBILE TERMINAL

CROSS REFERENCE TO RELATED APPLICATION

The present application claims priority to Korean Patent Application No. 10-2016-0105459, filed Aug. 19, 2016, the entire content of which is incorporated herein by reference.

BACKGROUND OF THE INVENTION

1. Field of the Invention

The present invention relates to a security technology against hacking of a computing system and, more particularly to a method and a system for configuring a simple kernel access control policy for efficiently setting and distributing an access control policy under an Android environment.

2. Description of Related Art

Security technologies for computer systems against hacking have been developed in various ways. Control of access to a call level in an operation system may be one of the strongest security technologies against hacking because it can fundamentally limit illegal access to system sources. Control of access to a system call level is performed in accordance with an access control policy, so the security levels of objects to be protected may depend on how minutely and strictly the policy has been formulated. Accordingly, it is very important to carefully formulate an access control policy in accordance with the security level required for a system.

However, it is very difficult for users who have no expert knowledge to make an access control policy for a system call unit. In particular, as smartphones are increasingly applied to work, it is required to limit illegal access to applications and data installed for work, so it is required to subdivide and specialize setting of an access control policy.

SUMMARY OF THE INVENTION

The present invention has been made in an effort to solve the problems in the related art and an object of the present invention is to provide a method and a system for setting a simple kernel access control policy, the method and system being able to simply and efficiently set an access control policy for the system, applications for work, and data of a mobile terminal in which an Android OS is installed through an interface.

In order to achieve the objects of the present invention, there is provided a method of configuring a simple kernel access control policy, the method being able to simply and efficiently set an access control policy for a mobile terminal system, in which an Android OS (Operating System) is installed, and application and data for work, through an interface.

The method of configuring a simple kernel access control policy for an Android-based mobile terminal includes: creating an entire list in a file system of a plurality of mobile terminals through a web user interface of a management server; creating a system policy set and an application policy set by recognizing in advance subjects and objects in the entire list by means of the management server, creating a group policy for each user group on the basis of the system policy set and the application policy set by means of the management server, distributing the group policies to the mobile terminals by means of the management server; and executing the group policies by means of the mobile terminals.

The group policy may be composed of a combined system policy set including system policy items of the system policy set and a combined application policy set including application policy items of the application policy set.

The user group may be composed of a plurality of users and a plurality of mobile terminals assigned to the users.

The type of the subjects may be defined as an application and a process and the type of the objects may be defined as a file, an application, a process, and a system.

The system policy set and the application policy set may be changed or added.

The system policy items may include an init protective policy for protecting an initial user process when kernel booting is finished, a zygote protective policy for protecting processes for executing applications, and a media protective policy for protecting processes for executing media.

The application policy items may include a camera application policy, a video application policy, a recorder application policy, and a map application policy.

According to another embodiment of the present invention, there is provided a system for configuring a simple kernel access control policy for an Android-based mobile terminal, the system including: a plurality of mobile terminals; and a management server. The management server may create an entire list in a file system of the mobile terminals through a web user interface, create a system policy set and an application policy set by recognizing in advance subjects and objects in the entire list, create a group policy for each user group on the basis of the system policy set and the application policy set, and distribute the group policies to the mobile terminals, and the mobile terminals may execute the group policies.

According to the present invention, it is possible to minimize the problem that it is difficult to make an access control policy and reduce the problem that it is impossible to flexibly cope with various demands for access control.

Further, by supporting various operations for the military and formulation of individual access control policies, it is possible to construct a mobile environment having high reliability for the military.

Further, by allowing for more flexibly and easily formulating an access control policy, it is possible to reduce the costs for formulating an access control policy.

BRIEF DESCRIPTION OF THE DRAWINGS

The above and other objects, features and other advantages of the present invention will be more clearly understood from the following detailed description when taken in conjunction with the accompanying drawings, in which:

FIG. 7 is an exemplary window of a system policy-creating UI (User Interface) according to an embodiment of the present invention;

FIG. 8 is an exemplary window of an application policy-creating UI (User Interface) according to an embodiment of the present invention;

FIG. 9 is an exemplary window of a group policy-creating UI (User Interface) according to an embodiment of the present invention;

FIG. 10 is an exemplary window of a policy-applying UI (User Interface) for distributing a policy for each group according to an embodiment of the present invention;

FIG. 11 is an exemplary window of a UI (User Interface) for selecting a group to be applied to the user group shown in FIG. 10;

DETAILED DESCRIPTION OF THE INVENTION

Figure 1:
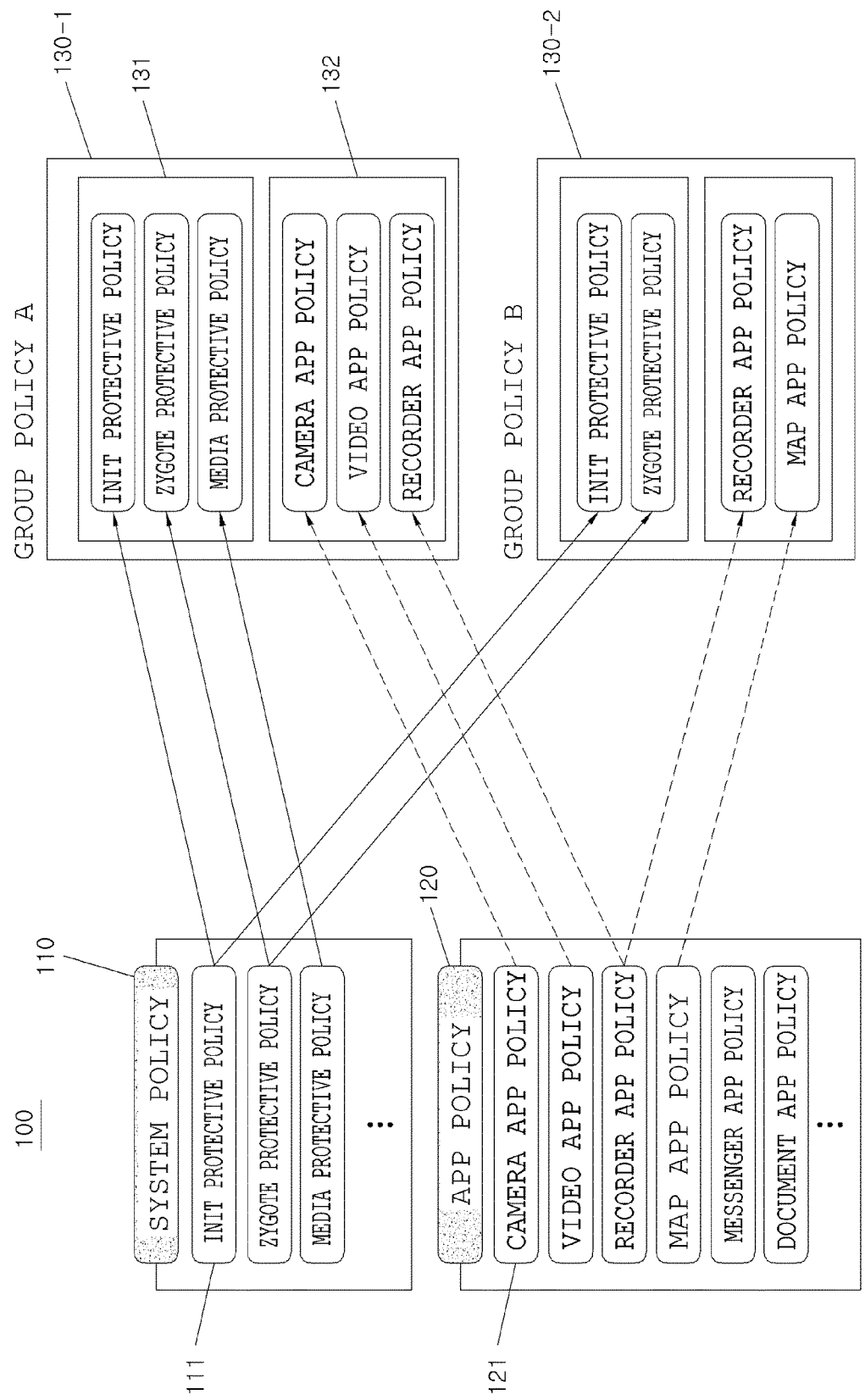
FIG. 1 is a conceptual diagram showing the concept of setting an access control policy for each group of users in an Android OS according to an embodiment of the present invention.

The present invention may be modified in various ways and implemented by various exemplary embodiments, so that specific exemplary embodiments are illustrated in the drawings and will be described in detail below. However, it is to be understood that the present invention is not limited to the specific exemplary embodiments, but includes all modifications, equivalents, and substitutions included in the spirit and the scope of the present invention.

Like reference numerals are given to like components in the description of the drawings.

Terms used in the specification, 'first', 'second', etc., may be used to describe various components, but the components are not to be construed as being limited to the terms. The terms are used to distinguish one component from another component.

For example, the 'first' component may be named the 'second' component, and vice versa, without departing from the scope of the present invention. The term 'and/or' includes a combination of a plurality of items or any one of a plurality of terms.

Unless otherwise defined, all terms including technical and scientific terms used herein have the same meaning as commonly understood by one of ordinary skill in the art to which the present invention belongs.

It will be further understood that terms used herein should be interpreted as having a meaning that is consistent with their meaning in the context of this specification and the relevant art and will not be interpreted in an idealized or overly formal sense unless expressly so defined herein.

A method and a system for setting a simple kernel access control policy for an Android-based mobile terminal according to an embodiment of the present invention are described hereafter in detail with reference to the accompanying drawings.

FIG. 1 is a conceptual diagram showing the concept of setting an access control policy for each group of users in an Android OS according to an embodiment of the present invention. Referring to FIG. 1, a group policy 100 is formulated for each user group and is composed of a system policy set 110 and an application policy set 120. The system policy set 110 is composed of access control policies for main protective elements (for example, files, processes, and system applications) in a system. The application policy set 120 is composed of access control policies for each application.

Obviously, the system policy set 110 includes a plurality of system policy items 111 and the system policy items, for example, may be an init protective policy for protecting the initial user process when kernel booting is finished, a zygote protective policy for protecting processes for executing applications, and a media protective policy for protecting processes for executing media.

The init process executes, including the work of initializing various devices, various demons for an Android framework operation, a context manager, a media server, and a zygote, and largely performs four functions. That is, the init process performs analyzing and executing an init.rc file, creating a device driver node, finishing child processes, and providing a property service.

Analysis and execution of the init.rc file analyzes the init.rc file in which the work that the init process has to perform is recorded, and performs the contents in the file.

The creating of a device driver node is a process of creating a device node for an application to access a device driver.

The finishing of child processes is to monitor other processes while the init process is performed as a background process after booting of a system is finished. If a process that is being monitored is finished into a zombie state, the sources of the process are normally returned.

The property service is to keep environmental variables for operating the system.

The zygote process can load dalvik vm, classes, and resource in advance and a process created in the type of fork inherits all of them, so applications can be quickly loaded.

The media process performs audio output and a camera service etc.

Similarly, the application policy set 120 also includes a plurality of application policy items 121 and the application policy items, for example, may be a camera application policy, a video application policy, a recorder application policy, and a map application policy. These policies limit or allow use of corresponding applications.

The system policy set and the application policy set can be combined to fit to the characteristics (work, mission, and environment etc.) of user groups to be applied, and combinations of the policy sets are integrated into a group policy. In other words, a group policy A 130-1 is a first group policy and is composed of a combined system policy set 131 composed of some of system policy items 111 of the system policy set 110 and a combined application policy set 132 composed of some of application policy items 121 of the application policy set 120.

Similarly, a group policy B 130-2 is a second group policy and is composed of a combined system policy set composed of some of the system policy items 111 of the system policy set 110 and a combined application policy set composed of some of the application policy items 121 of the application policy set 120.

Figure 2:
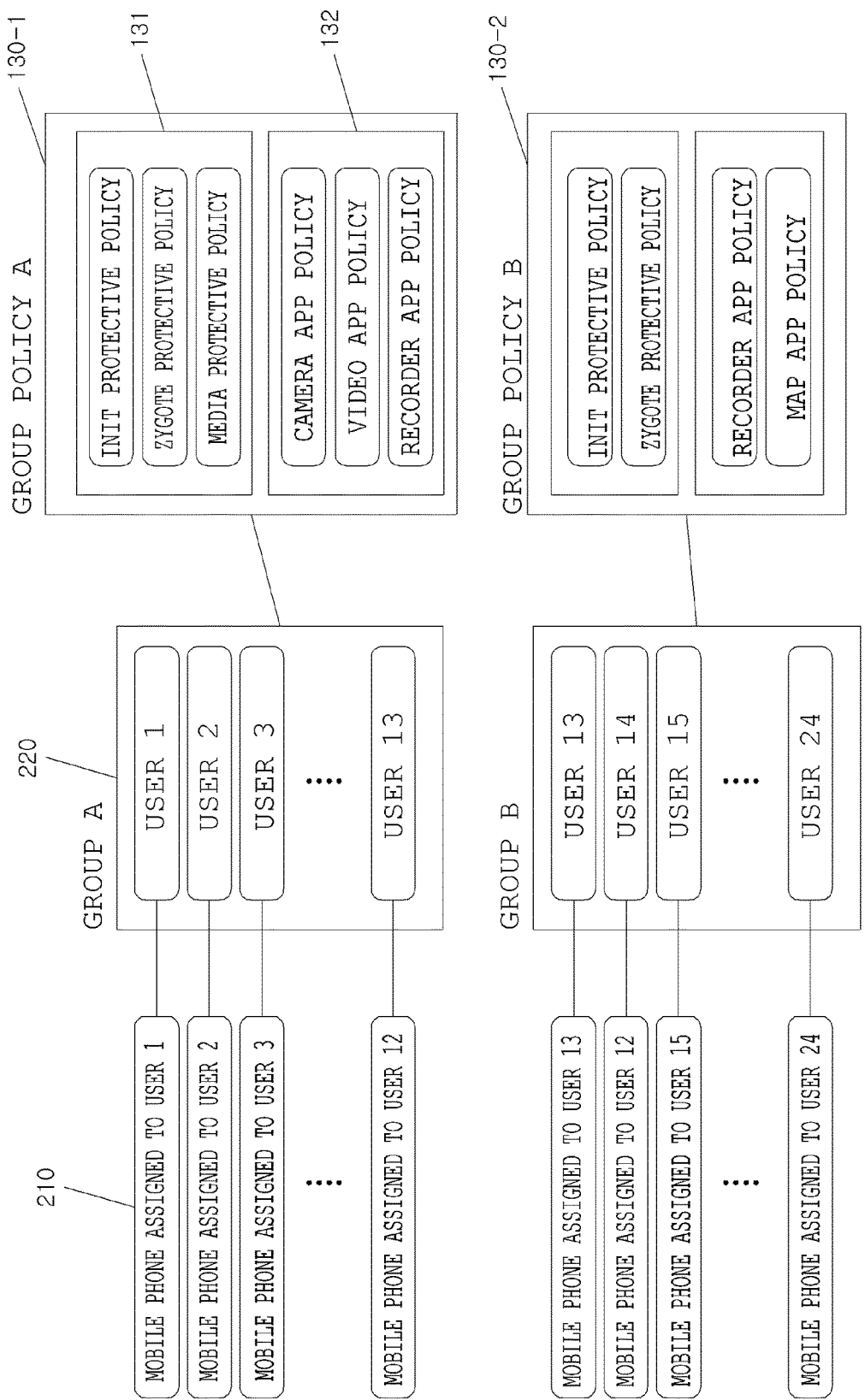
FIG. 2 is a conceptual view showing the concept of distributing the group policy created in FIG. 1 for each group of users in an organization.

FIG. 2 is a conceptual view showing the concept of distributing the group policy created in FIG. 1 for each group of users in an organization. Referring to FIG. 2, users and mobile terminals 210 (that is, mobile phones) assigned to the users are managed and user groups 220 are created in accordance with the work of the organization. In other words, user groups 220 are created based on the mobile terminals 210 assigned to users. That is, a user group A is composed of a user 1, a user 2, . . . a user 12 and a user group B is composed of a user 13, a user 14, . . . and a user 24. A group policy for the work of each group created in this way is assigned and distributed to each of the groups. In other words, a group policy A 130-1 is assigned to the group A and a group policy B 130-2 is assigned to the group B.

Figure 3:
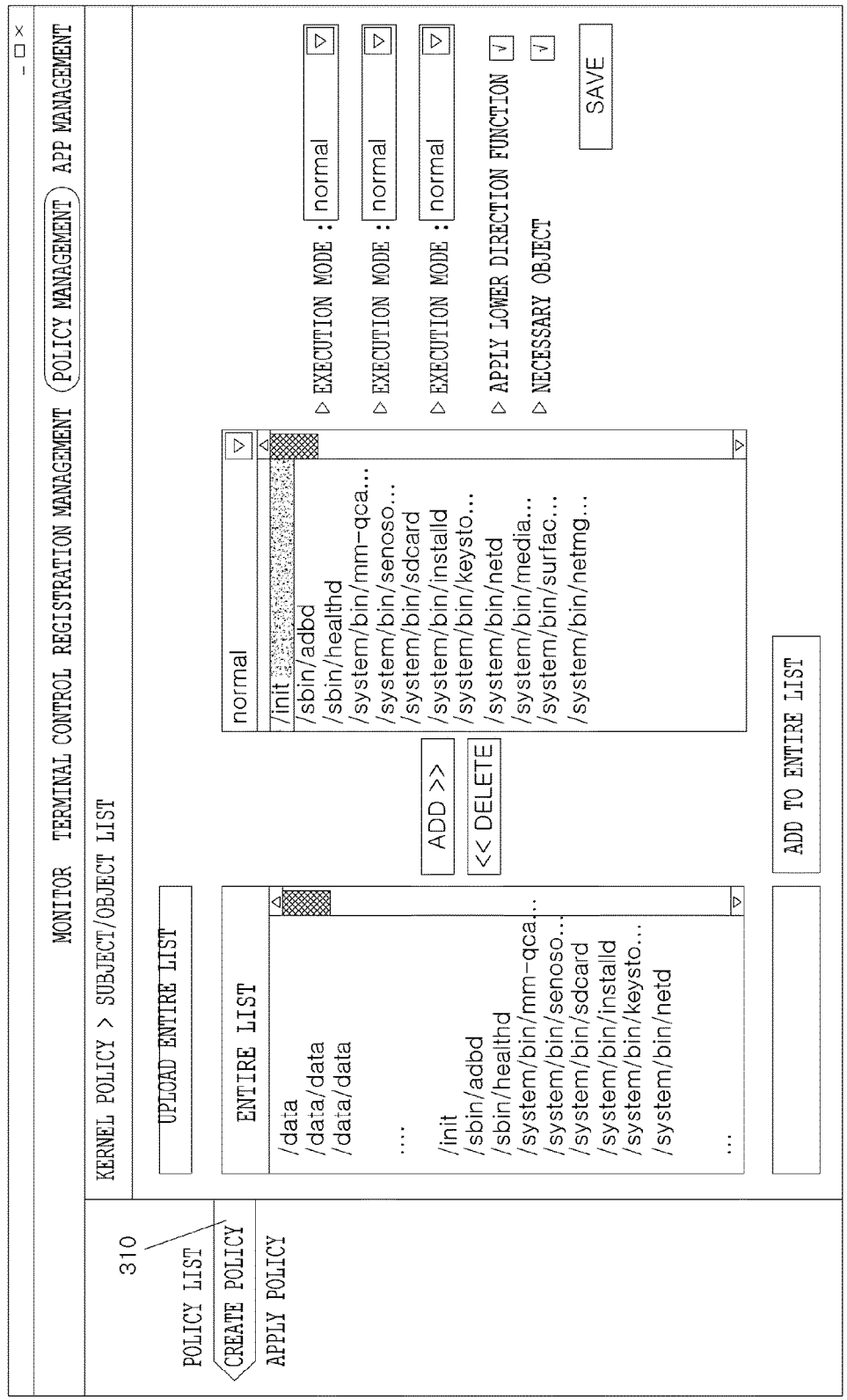
FIG. 3 is an exemplary window of a pre-ID UI (User Interface) for subjects and objects for setting an access control policy (a system and an application) according to an embodiment of the present invention.

FIG. 3 is an exemplary screen of a pre-ID UI (User Interface) for subjects and objects for setting an access control policy (a system and an application) according to an embodiment of the present invention. Referring to FIG. 3, the type of subjects is defined as an application and a process and the type of objects is defined as a file, an application, a process, and a system in an access control policy. A policy creation button 310 is selected through the user interface of FIG. 3 and main subjects and objects for setting an access control policy are recognized.

Figure 4:
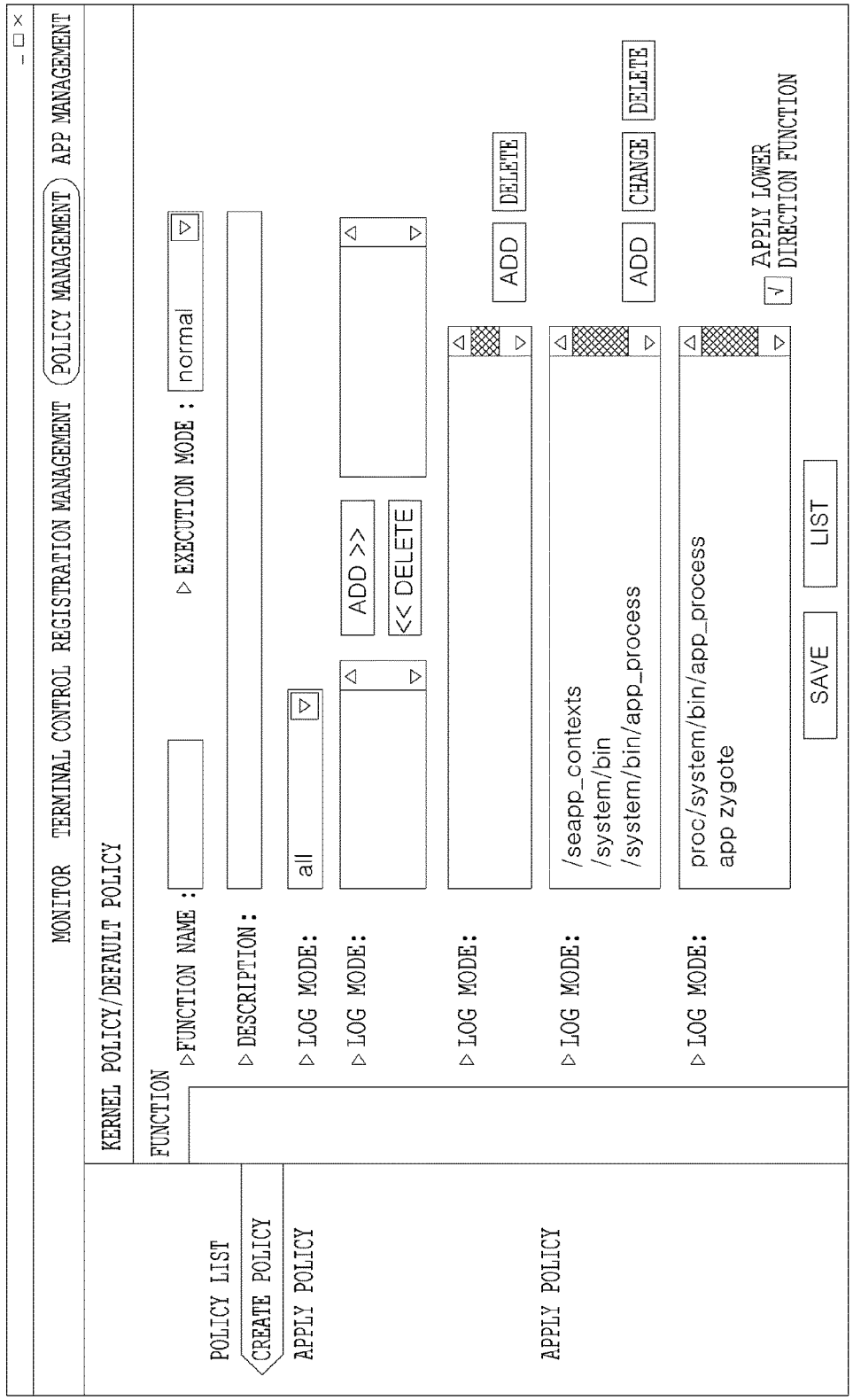
FIG. 4 is an exemplary window of an access control policy-setting UI (User Interface) according to an embodiment of the present invention.

FIG. 4 is an exemplary window of an access control policy setting UI (User Interface) according to an embodiment of the present invention. Referring to FIG. 4, an intuitive setting environment is provided in a way of setting the subjects and objects recognized in FIG. 3 and authorities for the objects.

Figure 5:
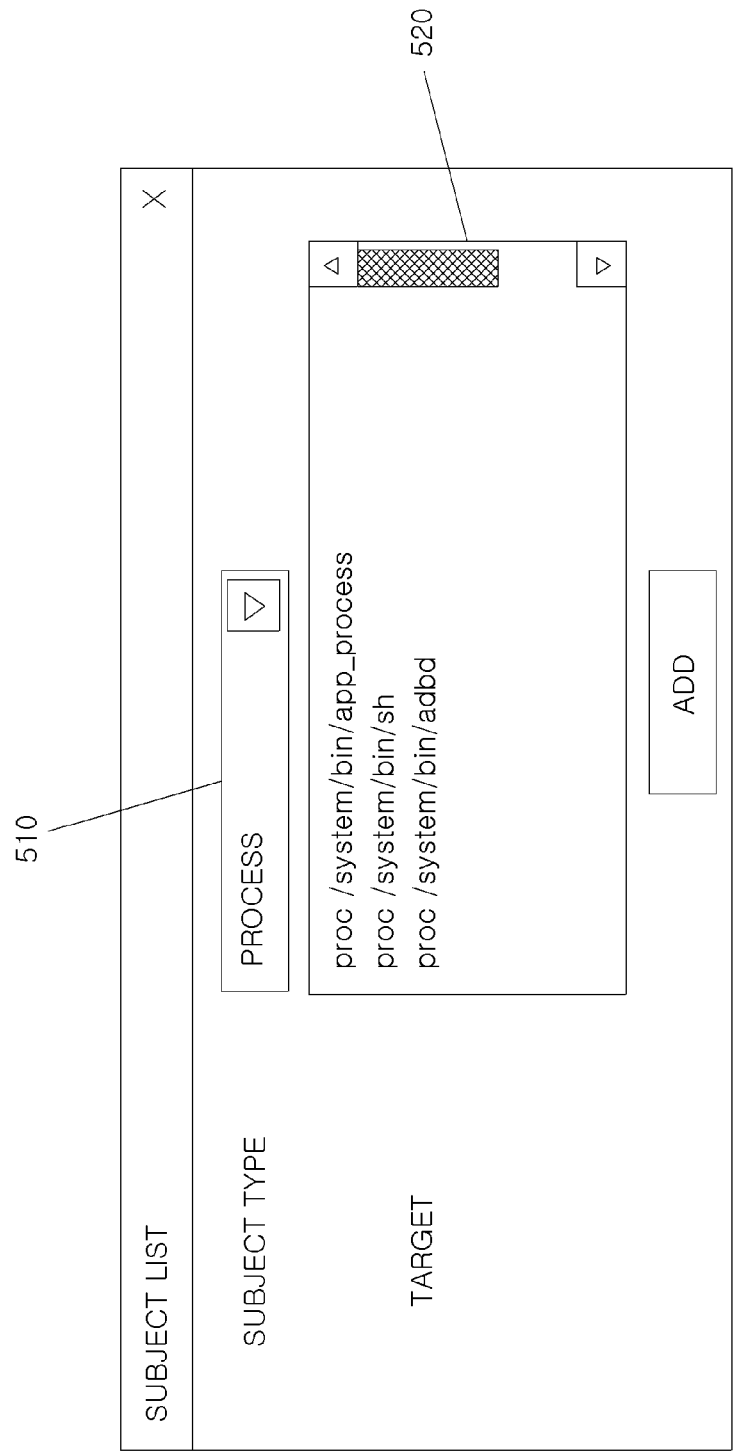
FIG. 5 is an exemplary window of a subject-setting UI (User Interface) when a subject list addition is selected in FIG. 4.

FIG. 5 is an exemplary window of a subject setting UI (User Interface) when a subject list addition is selected in FIG. 4. Referring to FIG. 5, the subjects recognized for each type in FIG. 3 are added as subjects of the access control policy. In other words, a process 510 is selected in the subject type and an object is added to a list 520.

Figure 6:
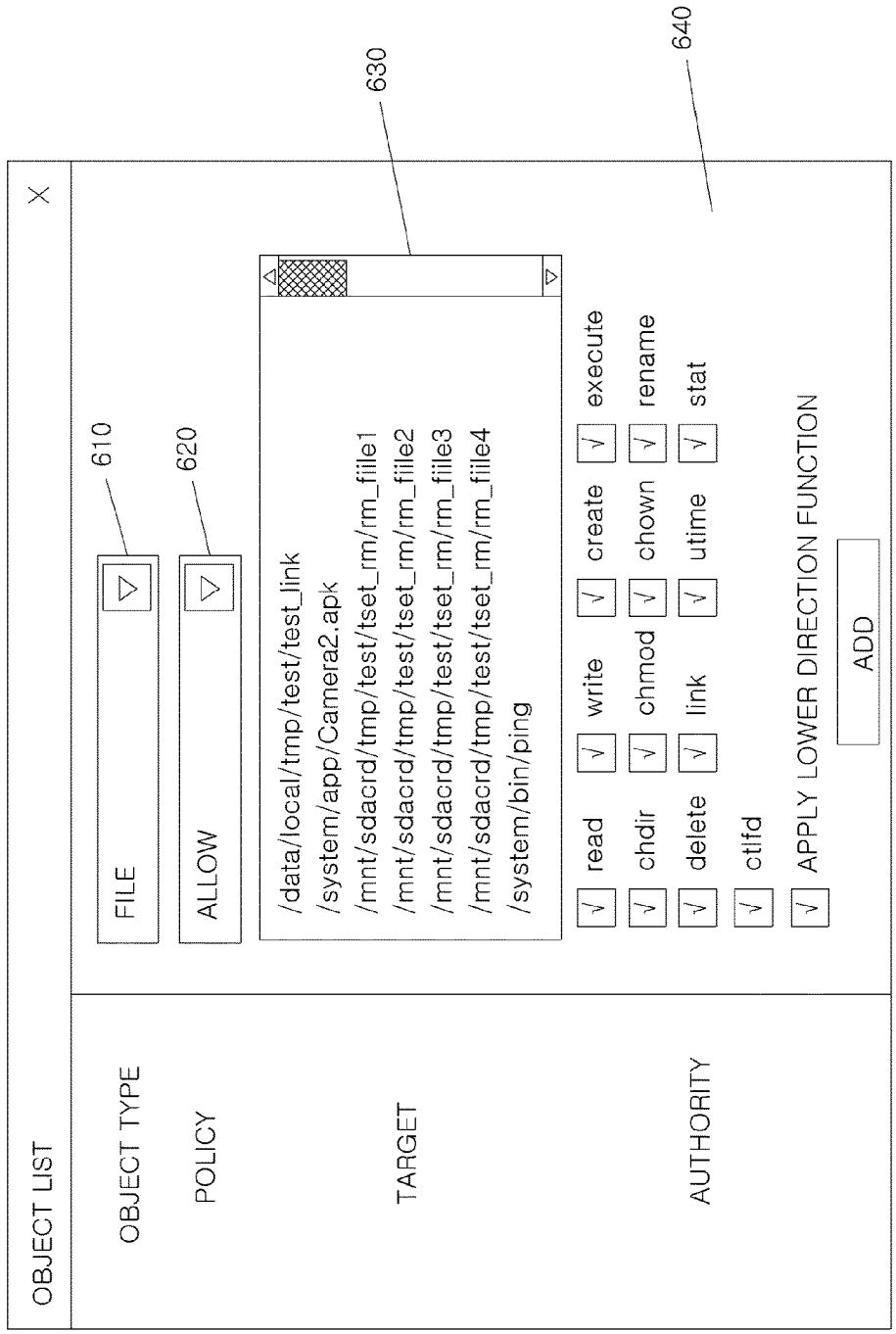
FIG. 6 is an exemplary window of an object-setting UI (User Interface) when an object list addition is selected in FIG. 4.

FIG. 6 is an exemplary window of an object setting UI (User Interface) when an object list addition is selected in FIG. 4. Referring to FIG. 6, the objects recognized for each type are added as objects of the access control policy and authorities that the subjects added in FIG. 5 can have for the objects added in FIG. 6 are set. For example, when the object type is a "file" 610, a policy is "allowed" 620, authorities 640 are set in the corresponding list 630. The authorities include reading, writing, creating, and executing etc.

FIG. 7 is an exemplary window of system policy-creating UI (User Interface) according to an embodiment of the present invention. Referring to FIG. 7, basic processes in the Android OS and individual policies for system applications are created. Obviously, correcting may be possible by selecting a correction button 710. Addition of a system policy is set through FIG. 4.

FIG. 8 is an exemplary window of an application policy-creating UI (User Interface) according to an embodiment of the present invention. Referring to FIG. 8, policies 820 for applications that are installed for users or the organization are created. Registration of a new application policy is set through FIG. 4.

FIG. 9 is an exemplary window of a group policy-creating UI (User Interface) according to an embodiment of the present invention. Referring to FIG. 9, a system policy set suitable for a group set is established by selecting the system policies created through FIG. 7. Further, an application policy set to be used in the group policy is established by selecting the application policies created through FIG. 8.

FIG. 10 is an exemplary window of a policy-applying UI (User Interface) for distributing a policy for each group according to an embodiment of the present invention. Referring to FIG. 10, the group policy set through FIG. 9 and user groups to which the policies are applied are connected.

FIG. 11 is an exemplary window of a UI (User Interface) for selecting a group to be applied to the user group shown in FIG. 10.

Figure 12:
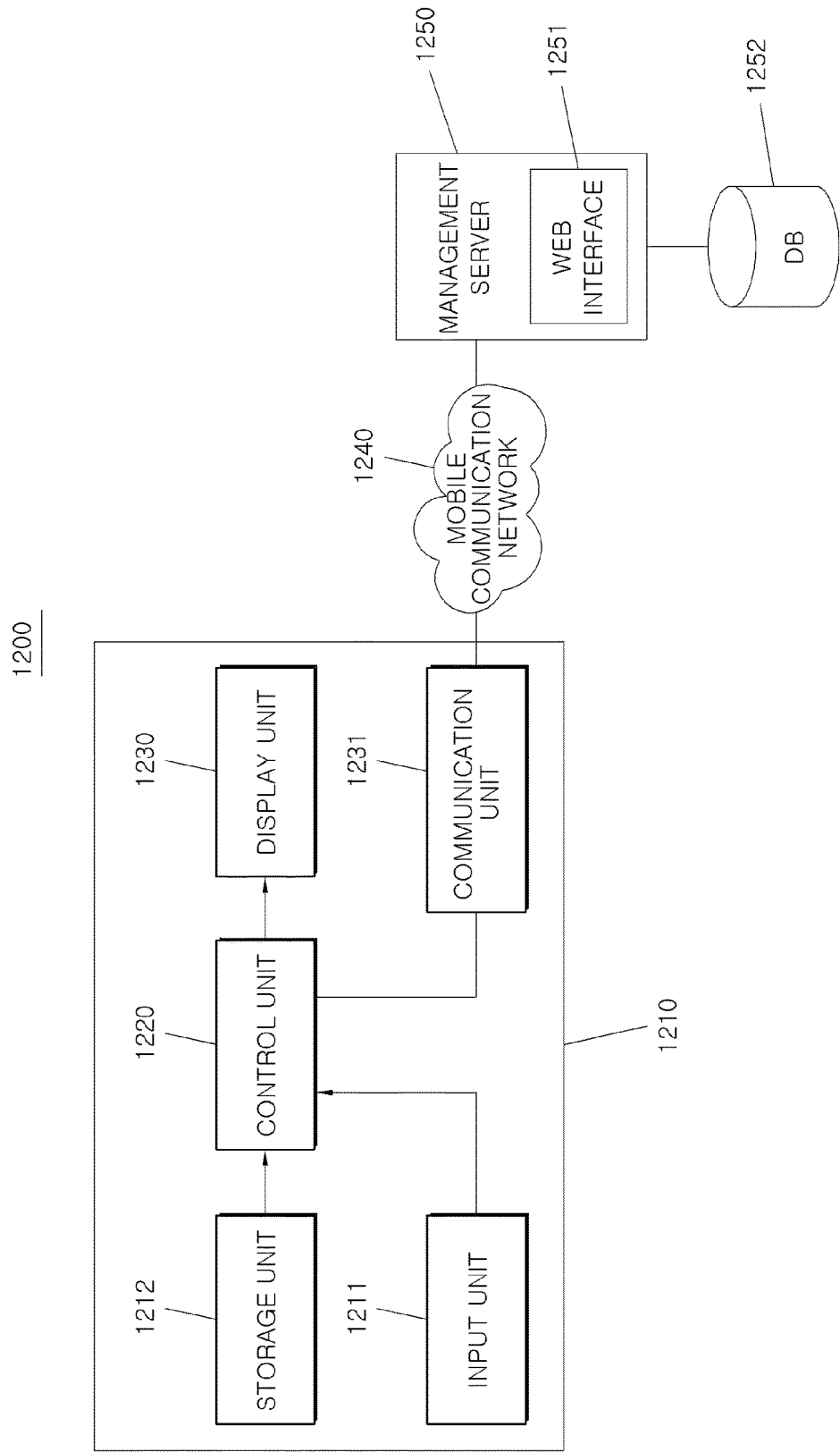
FIG. 12 is a block diagram showing the configuration of a simple kernel access control policy-setting system for an Android-based mobile terminal according to an embodiment of the present invention.

FIG. 12 is a block diagram showing the configuration of a simple kernel access control policy-setting system 1200 for an Android-based mobile terminal according to an embodiment of the present invention. Referring to FIG. 12, the kernel access control policy-setting system 1200 may include a mobile terminal 1210, a management server 1250, and a mobile communication network 1240 connecting the mobile terminal 1210 and the management server 1250 to each other.

The mobile terminal 1210 may include an input unit 1211 for inputting data and/or user input, a control unit 1220 that processes data and/or input signals, a display unit 1230 that displays processed information, a communication unit 1231 that is connected to the mobile communication network 1240 to transmit and receive data and/or signals, and a storage unit 1212 that keeps information processed by the control unit 1220 or keeps data for operating and/or managing a terminal.

The input unit 1211 may be a touch screen or a voice recognition device.

The storage unit 1212 keeps an OS program for operating the terminal 1210, a program having an algorithm receiving kernel policy information from the management server 1250 and limiting the terminal 1210 in accordance of the kernel policy information, and data etc. The storage unit 1212 may be a memory in the control unit 1220 or a specific memory. Accordingly, the storage unit is a combination of non-volatile memories such as a flash memory disk (SSD: Solid State Disk), a hard disk drive, a flash memory, an EEPROM (Electrically erasable programmable read-only memory), an SRAM (Static RAM), an FRAM (Ferro-electric RAM), a PRAM (Phase-change RAM), an MRAM (Magnetic RAM) and/or volatile memories such as a DRAM (Dynamic Random Access Memory), an SDRAM (Synchronous Dynamic Random Access Memory), and a DDR-SDRAM (Double Date Rate-SDRAM).

The display unit 1230 may be a touch screen, and LCD (Liquid Crystal Display), or an OLED (Organic Light Emitting Diode) and displays information.

The mobile communication network 1240 may include WiBro (Wireless Broadband Internet), WiMAX (World Interoperability for Microwave Access), UWB (ULTRA WIDE BAND), WiFi (Wireless Fidelity), UMTS (Universal Mobile Telecommunication System), in addition to CDMA (code division multiple access), GSM (global system for mobile communication), and WCDMA (wideband CDMA).

The management server 1250 is connected to the mobile terminal 1210 wirelessly and/or through a wire and distributes an access control policy (that is, a kernel policy). Obviously, for the access control policy, a database 1252 is provided to keep user information, mobile terminal information, and data for a kernel policy. Further, a web interface 1251 is provided for a manager to connect to the management server 1250 and create, change, and edit an access control policy.

Figure 13:
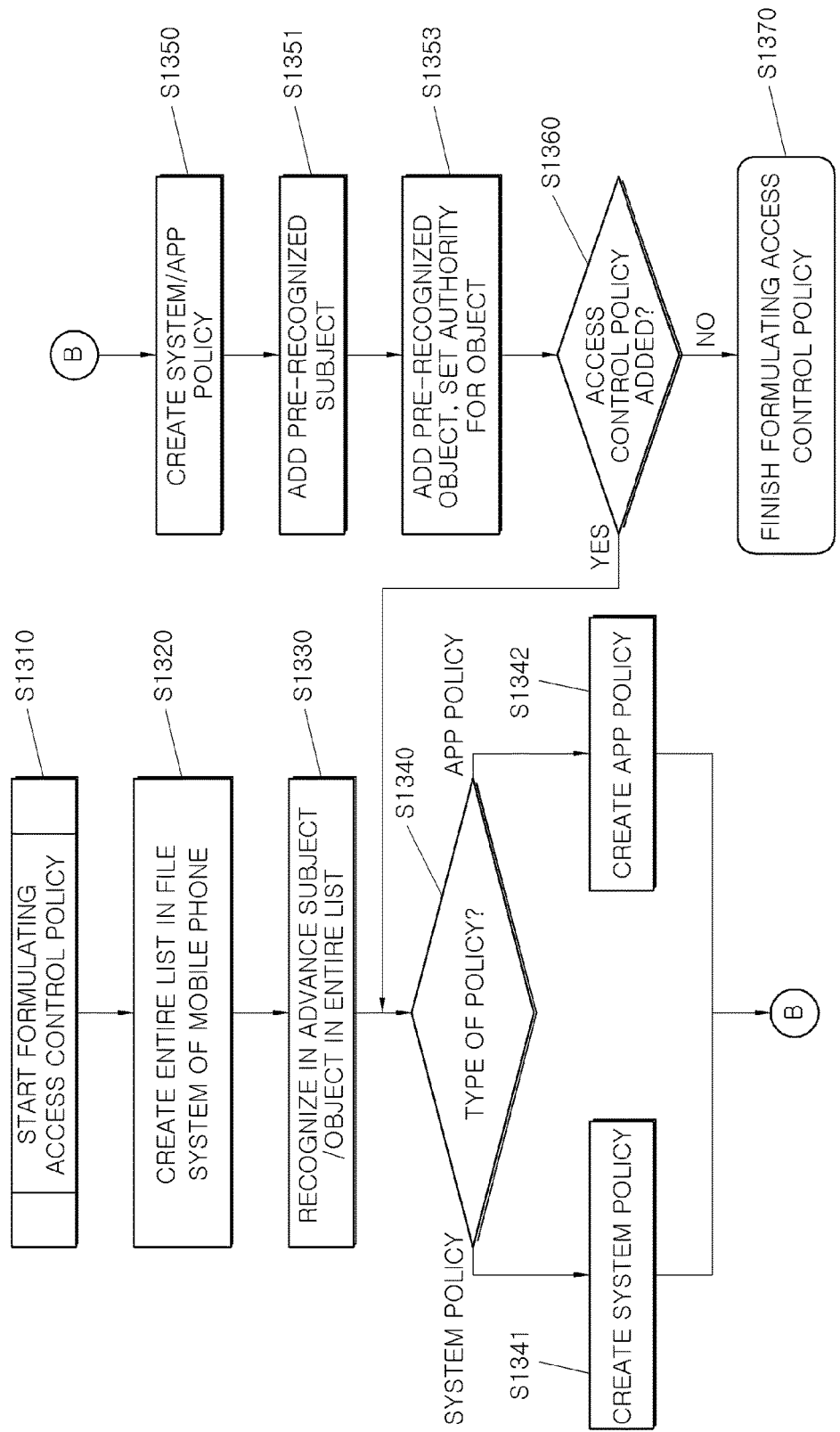
FIG. 13 is a flowchart for formulating an access control policy according to an embodiment of the present invention.

FIG. 13 is a flow chart for formulating an access control policy according to an embodiment of the present invention. Referring to FIG. 13, a manager (not shown) of the management server 1250 can connect the management server 1250 and start setting an access control policy, in which the entire list is created in a file system of the mobile terminal 1210 (S1310 and S1320).

A system policy and an application policy are created by recognizing in advance subjects/objects in the entire list (S1330, S1340, S1341, and S1342).

Further, an access control policy can be applied, and in this case, system policy/application policy are created again, pre-recognized subjects are added, pre-recognized objects are added, and authorities for the objects are set (S1350, S1351, S1353, S1360, and S1370).

Figure 14:
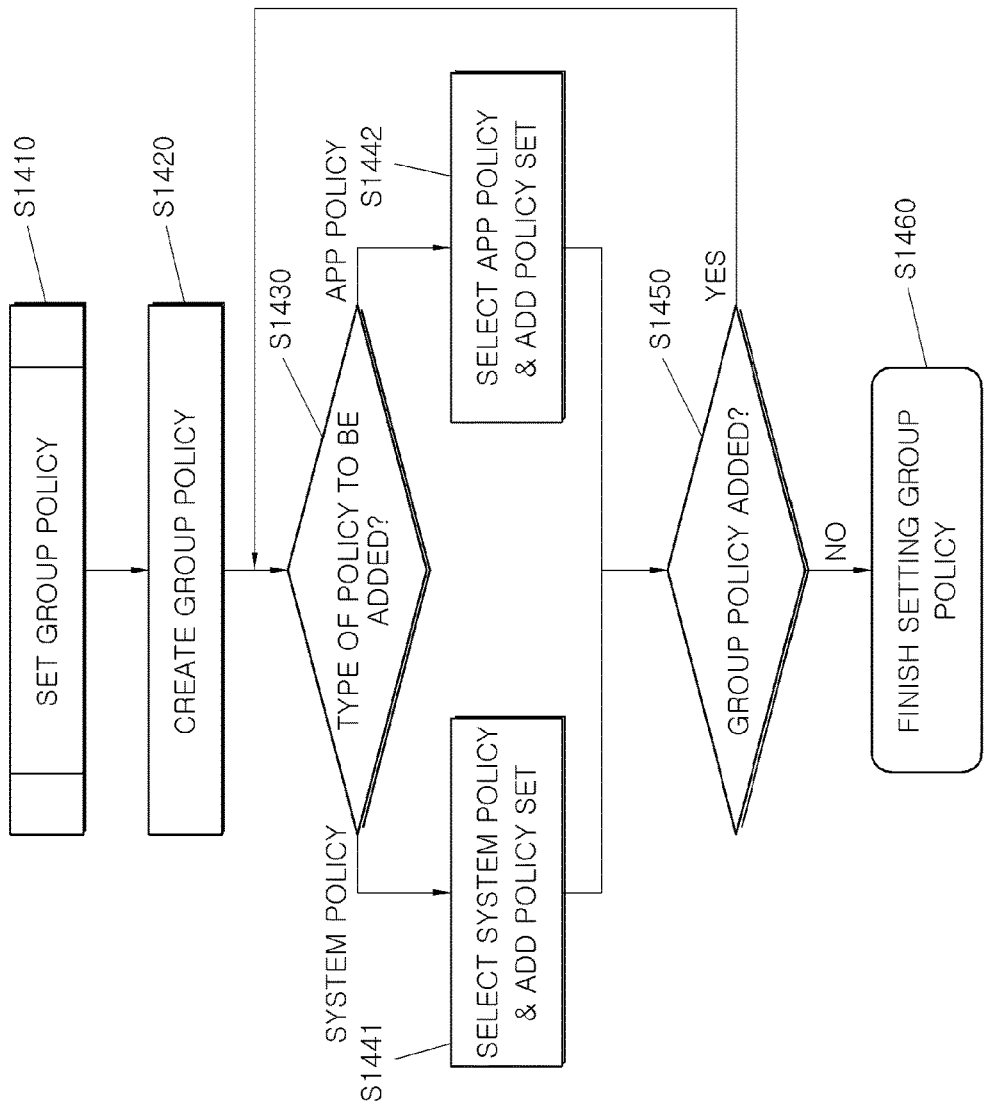
FIG. 14 is a flowchart for setting a group policy according to an embodiment of the present invention.

FIG. 14 is a flowchart for setting a group policy according to an embodiment of the present invention. Referring to FIG. 14, when a system policy and an application policy are created, a group policy is set and created (S1410 and S1420).

A system policy or an application policy is selected into a policy type to be added and a policy set is added (S1430, S1441, and S1442).

Thereafter, whether to further add a group policy is determined (S1450), and when there is a group policy to be added, steps of S1430 to S1450 are repeated. When there is no group policy to be added in S1450), setting group policies is finished (S1460).

Figure 15:
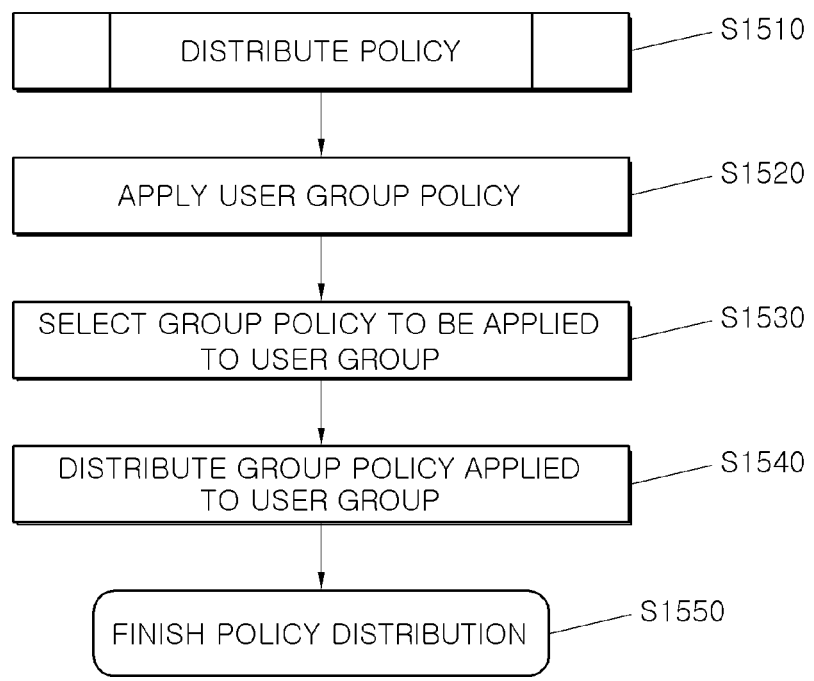
FIG. 15 is a flowchart for distributing a policy according to an embodiment of the present invention.

FIG. 15 is a flowchart for distributing a policy according to an embodiment of the present invention. Referring to FIG. 15, group policies are finished being set, a user group policy is applied and group policies to be applied to the user groups are selected (S1510, S1520, and S1530).

Thereafter, the group policies applied to the user groups are distributed and distribution of policies is finished (S1540 and S1550).

People skilled in the art would know that various exemplary logic blocks and algorithms described in relation to the embodiments may be implemented by electronic hardware, computer software, or a combination of them. Various exemplary blocks were generally described in terms of their functions to make the compatibility of hardware and software clear.

However, whether the functions are implemented by hardware or software depends on design limits and specific applications in the entire system. People skilled in the art may implement the functions in various ways for the specific applications, but this case should not be construed as deviating from the exemplary embodiments of the present invention.

Various logic blocks described in relation to the embodiments described herein may be achieved by a general purpose processor, a digital signal processor (DSP), an application-specific integrated circuit (AISC), a field-programmable gate array (FPGA) or another programmable logic device, a discrete gate or a transistor logic, discrete hardware components, or combinations of them for performing the functions described herein.

The general purpose processor may be a microprocessor, but may be any processor, controller, microcontroller, or state machine used in the art. Further, the processor may be a combination of computing devices, for example, a combination of a DSP and a microprocessor, a combination of microprocessors, a combination of one or more microprocessors combined with a DSP core, and other combinations.

What is claimed is:

1. A method of configuring a simple kernel access control policy for an Android-based mobile terminal, the method comprising:
    creating an entire list in a file system of a plurality of mobile terminals through a web user interface of a management server;
    creating a system policy set and an application policy set by recognizing in advance subjects and objects in the entire list by means of the management server;
    creating a group policy for each user group on the basis of the system policy set and the application policy set by means of the management server;
    distributing the group policies to the mobile terminals by means of the management server; and
    executing the group policies by means of the mobile terminals,
    wherein the group policy is composed of a combined system policy set including system policy items of the system policy set and a combined application policy set including application policy items of the application policy set,
    wherein the system policy items include an init protective policy for protecting an initial user process when kernel booting is finished, a zygote protective policy for protecting processes for executing applications, and a media protective policy for protecting processes for executing media, and
    the application policy items include a camera application policy, a video application policy, a recorder application policy, and a map application policy.

2. The method of claim 1, wherein the user group is composed of a plurality of users and a plurality of mobile terminals assigned to the users.

3. The method of claim 1, wherein a type of the subjects is defined as an application and a process and a type of the objects is defined as a file, an application, a process, and a system.

4. The method of claim 1, wherein the system policy set and the application policy set can be changed or added.

5. A system for configuring a simple kernel access control policy for an Android-based mobile terminal, the system comprising:
    a plurality of mobile terminals; and
    a management server creating an entire list in a file system of the mobile terminals through a web user interface, creating a system policy set and an application policy set by recognizing in advance subjects and objects in the entire list, creating a group policy for each user group on the basis of the system policy set and the application policy set, and distributing the group policies to the mobile terminals,
    wherein the mobile terminals execute the group policies,
    wherein the group policy is composed of a combined system policy set including system policy items of the system policy set and a combined application policy set including application policy items of the application policy set,
    wherein the system policy items include an init protective policy for protecting an initial user process when kernel booting is finished, a zygote protective policy for protecting processes for executing applications, and a media protective policy for protecting processes for executing media, and
    the application policy items include a camera application policy, a video application policy, a recorder application policy, and a map application policy.

* * * * *